United States Patent
Iwai et al.

(10) Patent No.: US 8,737,338 B2
(45) Date of Patent: May 27, 2014

(54) RADIO COMMUNICATION TERMINAL DEVICE AND RADIO COMMUNICATION METHOD

(75) Inventors: Takashi Iwai, Ishikawa (JP); Akihiko Nishio, Kanagawa (JP); Yoshihiko Ogawa, Kanagawa (JP); Seigo Nakao, Kanagawa (JP); Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 13/383,297

(22) PCT Filed: Jul. 16, 2010

(86) PCT No.: PCT/JP2010/004625
§ 371 (c)(1),
(2), (4) Date: Jan. 10, 2012

(87) PCT Pub. No.: WO2011/007583
PCT Pub. Date: Jan. 20, 2011

(65) Prior Publication Data
US 2012/0177090 A1      Jul. 12, 2012

(30) Foreign Application Priority Data
Jul. 17, 2009  (JP) .................................. 2009-169211

(51) Int. Cl.
*H04W 4/00*      (2009.01)

(52) U.S. Cl.
USPC .......................................... 370/329; 370/208

(58) Field of Classification Search
CPC . H04L 5/0007; H04L 27/2647; H04W 80/04; H04W 88/06; H04W 28/04; H04W 72/04
USPC .................. 370/203, 208, 328, 329
See application file for complete search history.

(56) References Cited

U.S. PATENT DOCUMENTS

2005/0181794 A1 * 8/2005 Rajkotia ....................... 455/436
2008/0253484 A1   10/2008 Kakura et al.
(Continued)

FOREIGN PATENT DOCUMENTS

CN     101132383 A    2/2008
CN     101242219 A    8/2008
(Continued)

OTHER PUBLICATIONS

3GPP TSG RAN WG1 Meeting #57, San Francisco, USA May 4-8, 2009, Nokia Siemens Networks, Nokia, Uplink DM RS from CoMP viewpoint, R1-091760.
International Search Report for PCT/JP2010/004625 dated Oct. 5, 2010.
Chinese Search Report for Application No. 201080028356.6 dated Feb. 18, 2014.

*Primary Examiner* — Ronald Abelson
(74) *Attorney, Agent, or Firm* — Pearne & Gordon LLP

(57) ABSTRACT

Provided are a radio communication terminal apparatus and a radio transmission method by which intersymbol interference of DM-RS of a CoMP terminal and a Non-CoMP terminal can be reduced. A CoMP set setting unit (102) sets the cell IDs of all cells in the CoMP set in a cell selection unit (104), and a serving cell setting unit (103) sets the cell ID of the serving cell in the cell selection unit (104). The cell selection unit (104) selects the cell ID having a number closest to the cell ID of the serving cell from the cells in the CoMP set. A sequence information calculation unit (106) derives a sequence group number from the selected cell ID, and the sequence information calculation unit (106) calculates a sequence number from the derived sequence group number and a transmission bandwidth of the DM-RS.

4 Claims, 10 Drawing Sheets

(56) References Cited

U.S. PATENT DOCUMENTS

2010/0002804 A1   1/2010   Ogawa et al.
2010/0061333 A1*  3/2010   Marsh et al. .................. 370/330
2010/0210274 A1   8/2010   Iwai et al.

FOREIGN PATENT DOCUMENTS

| WO | 2008093716 A1 | 8/2008 |
| WO | 2008094014 A2 | 8/2008 |
| WO | 2008155907 A1 | 12/2008 |

* cited by examiner

PRIOR ART

RADIO COMMUNICATION TERMINAL DEVICE AND RADIO COMMUNICATION METHOD

TECHNICAL FIELD

The present invention relates to a radio communication terminal apparatus and a radio communication method.

BACKGROUND ART

In the LTE-Advanced developed from the 3rd Generation Partnership Project Long Term Evolution (3GPP LTE), it is under consideration to introduce uplink coordinated multiple point transmission and reception (UL CoMP). The CoMP refers to a technique of improving the throughput of a terminal in a cell edge region such that a plurality of cells (base stations) perform transmission and reception of a signal with a radio communication terminal apparatus (hereinafter, referred to as "terminal") in a coordinated manner. The UL CoMP improves the reception quality by receiving a signal transmitted from one terminal at a plurality of cells (base stations) and synthesizing the received signals. Further, in order to reduce influence of intercell interference, a plurality of cells in a CoMP set (a group of cells that perform transmission and reception in a coordinated manner) schedule the terminal in a coordinated manner not to increase intercell interference.

In Non-Patent Literature 1, in order to further increase the performance improvement effect of the UL CoMP, it has been discussed to introduce a multiple user-multiple input multiple output (MU-MIMO) technique between a terminal to which the UL CoMP is applied, that is, a terminal of which transmission signal is received and synthesized at a plurality of cells (hereinafter, referred to as "CoMP terminal") and a terminal to which the UL CoMP is not applied (hereinafter, referred to as "non-CoMP terminal"). The MIMO is a technique of simultaneously spatially multiplexing and transmitting different signal sequences at the same frequency by the use of a plurality of antennas at both transmitter and receiver stations. Further, the MU-MIMO can improve frequency use efficiency of a system through a technique of performing MIMO communication between a plurality of terminals and a base station.

In the MU-MIMO communication, in order to demultiplex signals of different terminals, it is necessary to transmit an orthogonal data demodulation reference signal (hereinafter, referred to as "DM-RS") between terminals. In the uplink of the conventional LTE in which the CoMP is not performed, the MU-MIMO technique is employed between the non-CoMP terminals, and an orthogonal cyclic shifted Zadoff-Chu (CS-ZC) sequence is used between terminals as the DM-RS. The CS-ZC sequence is a sequence obtained by cyclic-shifting a ZC sequence, and a plurality of CS-ZC sequences obtained by cyclic-shifting the ZC sequence of the same sequence number can be made orthogonal to one another by setting a value larger than a maximum propagation delay time of a transmission signal of a terminal as a cyclic shift amount. Further, in the uplink of the LTE, a sequence group in which a ZC sequence number for the DM-RS of each transmission bandwidth available within a cell is defined is configured, and one sequence group is assigned to each cell. By informing terminals within a cell of a sequence group number, the base station may not perform signaling of the ZC sequence number for the DM-RS by a change in a transmission bandwidth. Further, 30 sequence groups are defined, and in order to reduce intercell interference, different sequence groups are assigned to neighboring cells.

However, when the DM-RS of the LTE is applied to the CoMP terminal "as is", as will be described below, the DM-RS of the CoMP terminal may not be orthogonal to the DM-RS of the non-CoMP terminal, and thus the reception performance at the time of MU-MIMO may degrade. As illustrated in FIG. 1, a DM-RS transmitted from a one certain CoMP terminal is received at a plurality of cells (base stations). Since the DM-RSs received at the plurality of cells are the same signals transmitted from one terminal, a cell in which the ZC sequence number for the DM-RS of the CoMP terminal is different from the ZC sequence number for the DM-RS of the non-CoMP terminal occurs as in a cell 2 of FIG. 1. Since the ZC sequences having different sequence numbers are not orthogonal to each other, interference (cross correlation) occurs between terminals in this cell, and thus the reception performance at the time of MU-MIMO degrades.

In Non-Patent Literature 1, a Walsh sequence is used to have the DM-RS of the CoMP terminal to be orthogonal to the DM-RS of the Non-CoMP terminal. In the LTE, as illustrated in FIG. 2, two DM-RSs are transmitted through one sub frame; however, each of the two DM-RSs is multiplied by a Walsh sequence ((1,1) or (1,−1)) of which sequence length is 2. A receiver side multiplies the two DM-RSs by the same Walsh sequence as a transmitter side, and performs in-phase addition of the multiplied DM-RSs. If there is no temporal change in a channel between the two DM-RSs, the DM-RSs multiplied by different Walsh sequences by the in-phase addition process (interference components) have phases opposite to each other, and thus interference can be completely removed. Even when neighboring cells have different sequence group numbers (sequence numbers) as in the LTE, if there is no temporal change in a channel, the DM-RSs can be orthogonal to each other by multiplying the DM-RSs by different Walsh sequences.

Further, in Non-Patent Literature 1, it is stated that one sequence group used for generating the DM-RS of the CoMP terminal is selected from sequence groups (30 groups as in the LTE) used in the CoMP set; however, a concrete method of selecting the sequence group is not stated. Further, similarly to the non-CoMP terminal, it is considered to select the sequence group used by a cell (serving cell) that transmits control information to the own terminal.

CITATION LIST

Non-Patent Literature

NPTL 1
3GPP R1-091760, Nokia Siemens Networks, Nokia, "Uplink DM RS from CoMP viewpoint"

SUMMARY OF INVENTION

Technical Problem

However, when there is a temporal change in a channel between the two DM-RSs, othogonality by the Walsh sequence collapses, and interference occurs between the CoMP terminal and the non-CoMP terminal. When there is a temporal change in a channel, the interference components of the two DM-RSs change in phase and amplitude. In the in-phase addition process of the two DM-RSs at the receiver side, the interference components do not have phases completely opposite to each other, and thus the interference components remain.

When intersymbol interference between the DM-RS of the CoMP terminal and the DM-RS of the non-CoMP terminal is strong, it is difficult to demultiplex data of each terminal in MU-MIMO communication, and the reception performance significantly degrades.

It is an object of the present invention to provide a radio communication terminal apparatus and a radio communication method, which are capable of reducing intersymbol interference between the DM-RS of the CoMP terminal and the DM-RS of the non-CoMP terminal.

Solution to Problem

A radio communication terminal apparatus that performs transmission and reception with a plurality of base stations that perform transmission and reception in a coordinated manner, includes a base station selection section that selects a base station other than a base station that transmits control information addressed to the radio communication terminal apparatus from among the plurality of base stations, a Zadoff-Chu (ZC) sequence generation section that generates a reference signal using a ZC sequence assigned to the selected base station, and a transmission section that transmits the generated reference signal.

A radio communication method of allowing a plurality of base stations to perform transmission and reception with a radio communication terminal apparatus in a coordinated manner, includes selecting a base station other than a base station that transmits control information addressed to the radio communication terminal apparatus from among the plurality of base stations, generating a reference signal using a Zadoff-Chu (ZC) sequence assigned to the selected base station, and transmitting the generated reference signal.

Advantageous Effects of Invention

According to the present invention, it is possible to reduce intersymbol interference between the DM-RS of the CoMP terminal and the DM-RS of the non-CoMP terminal.

DESCRIPTION OF EMBODIMENTS

Figure 1:
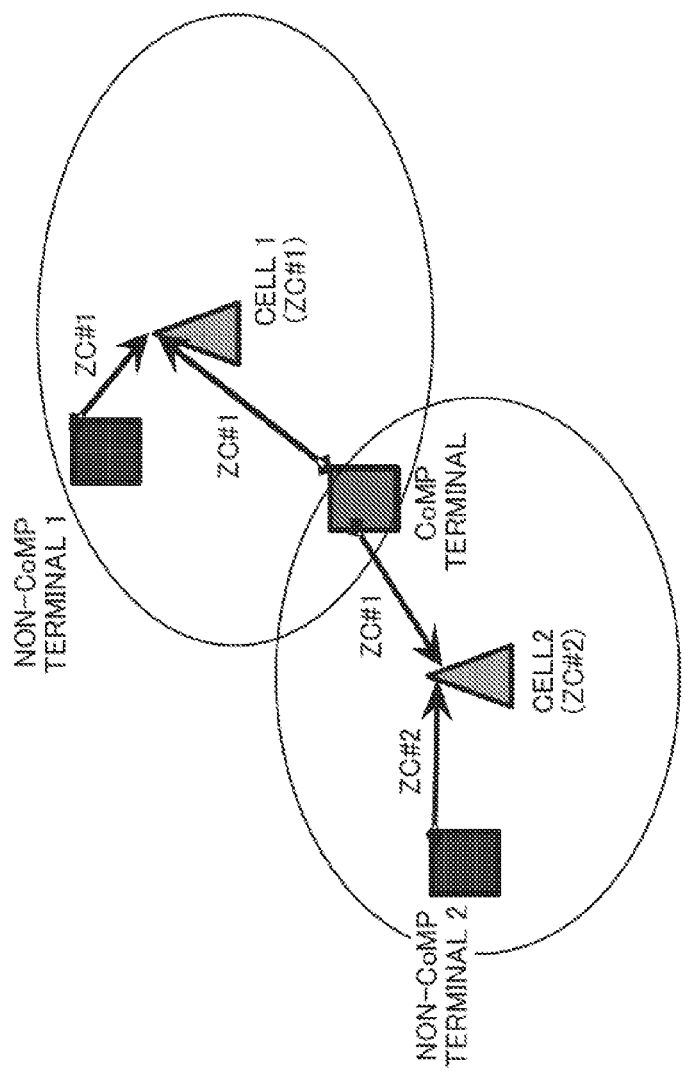
FIG. 1 is a diagram illustrating a state in which a CoMP terminal performs MU-MIMO with a non-CoMP terminal.

The inventor has devised the present invention by focusing attention on the following two points. Firstly, DM-RS intersymbol interference between terminals (the CoMP terminal and the non CoMP terminal) occurring due to collapse of othogonality of the Walsh sequence increases when the DM-RSs of the two terminals use the same sequence group (sequence number). A correlation characteristic between the DM-RSs using the same sequence group (sequence number) becomes an autocorrelation characteristic, and thus is much higher in a maximum correlation value than a cross correlation characteristic between different sequence numbers.

Secondly, as a path loss between a terminal and a base station decreases, interference occurring due to collapse of othogonality of the Walsh sequence increases. The CoMP terminal transmits a signal at predetermined power, and the signal is received by a plurality of base stations. In this case, as a path loss between the CoMP terminal and the base station decreases, a reception level increases. Thus, when interference occurs due to collapse of othogonality of the Walsh sequence, the smaller the pass loss is, the higher interference power is.

Embodiments of the present invention made by focusing the above points will be described in detail with reference to the accompanying drawings. In the following embodiments, components having the same function are denoted by the same reference numerals, and the redundant description will not be repeated.

(Embodiment 1)

Figure 3:
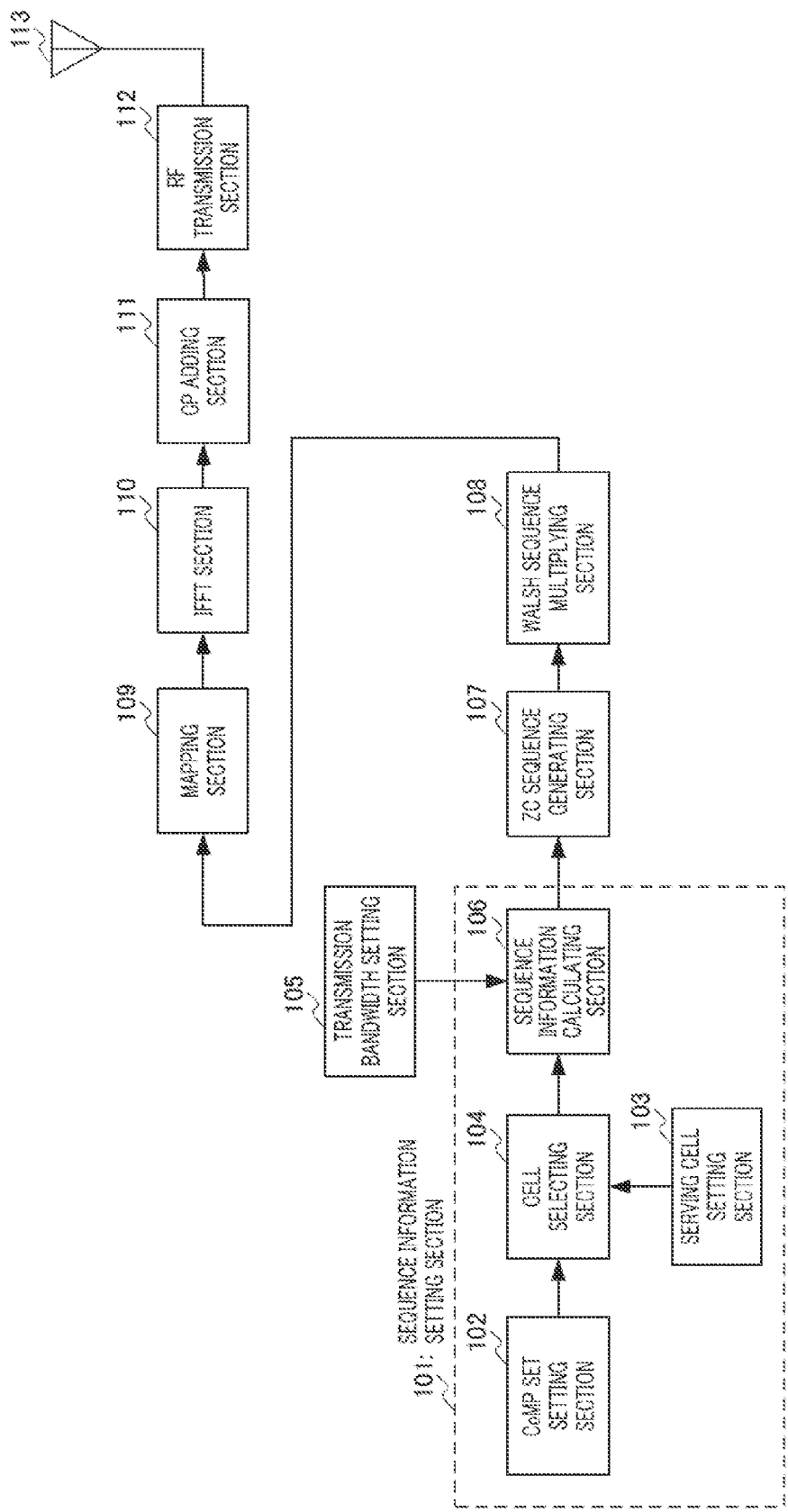
FIG. 3 is a block diagram illustrating the configuration of a terminal according to Embodiment 1 of the present invention.

FIG. 3 is a block diagram illustrating the configuration of a terminal according to Embodiment 1 of the present invention. Referring to FIG. 3, sequence information setting section 101 includes CoMP set setting section 102, serving cell setting section 103, cell selection section 104, and sequence information calculating section 106.

CoMP set setting section 102 stores cell IDs of all cells in a CoMP set, and outputs the stored cell IDs of all cells to cell selection section 104.

Serving cell setting section 103 outputs a cell ID of a cell that transmits control information addressed to the own terminal, that is, a cell ID of a serving cell, to cell selection section 104.

Cell selection section 104 selects a cell ID of a cell other than the serving cell among cells in the CoMP set, based on the cell ID output from CoMP set setting section 102 and the cell ID of the serving cell output from serving cell setting section 103. For example, a cell ID of which number is closest to (or farthest from) the cell ID of the serving cell from the cell IDs in the CoMP set may be selected. That is, a predetermined rule is agreed between the terminal and the base station in advance. Then, information from which a sequence group number for a DM-RS used in the selected cell can be derived is output to sequence information calculating section 106. For example, when the sequence group number is uniquely associated with the cell ID, the cell ID of the selected cell is output. When the sequence group number is derived using a cell-specific parameter other than the cell ID, both the cell ID and the parameter are output.

Transmission bandwidth setting section 105 stores a transmission bandwidth of the DM-RS, and outputs the stored transmission bandwidth of the DM-RS to sequence information calculating section 106.

Sequence information calculating section 106 calculates a sequence number and a sequence length of a sequence used as the DM-RS for the CoMP terminal based on the transmission bandwidth of the DM-RS output from transmission bandwidth setting section 105 and the information, from which the sequence group number for the DM-RS can be derived, output from cell selection section 104. Sequence information calculating section 106 first derives a sequence group number based on the information output from cell selection section 104. Subsequently, a sequence number corresponding to the transmission bandwidth is obtained based on the derived sequence group. Then, the sequence length corresponding to the number of sub carriers of the transmission bandwidth is calculated. The obtained sequence number and the sequence length are output to ZC sequence generation section 107.

ZC sequence generation section 107 generates a ZC sequence using the sequence number and the sequence length output from sequence information calculating section 106, and outputs the ZC sequence to Walsh sequence multiplying section 108.

Figure 2:
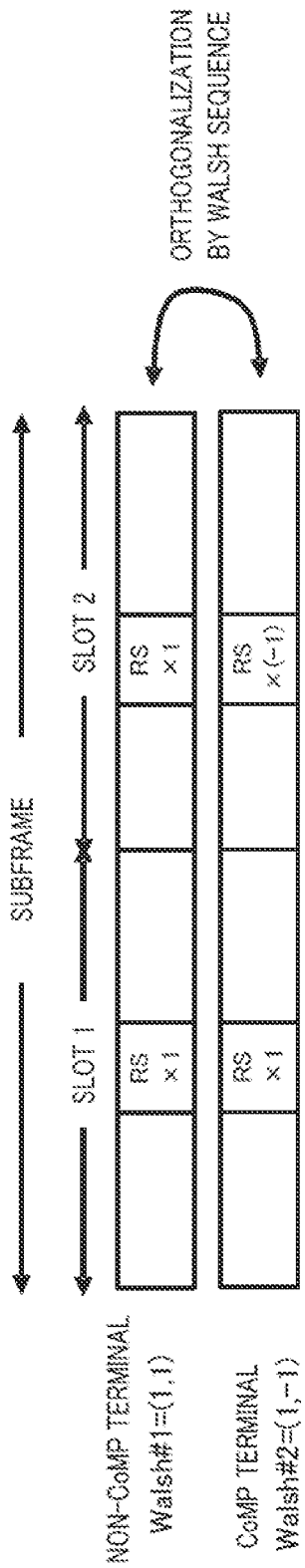
FIG. 2 is a diagram illustrating a DM-RS using a Walsh sequence.

Walsh sequence multiplying section 108 multiplies the ZC sequence for the DM-RS of slots 1 and 2 by a Walsh sequence having a sequence length of 2 as illustrated in FIG. 2, and outputs the resultant ZC sequence to mapping section 109.

Mapping section 109 maps the ZC sequence output from Walsh sequence multiplying section 108 with the transmission band of the own terminal, and outputs the resultant ZC sequence to inverse fast Fourier transform (IFFT) section 110.

IFFT section 110 executes an IFFT process on the ZC sequence output from mapping section 109, and outputs the ZC sequence that has been subjected to the IFFT process to CP adding section 111.

CP adding section 111 adds the same signal as a frame tail part of a signal output from IFFT section 110 to a frame header as a cyclic prefix (CP), and outputs the resultant signal to RF transmission section 112.

RF transmission section 112 executes a transmission process, such as digital-to-analog (DA) conversion, up-conversion, and amplification, on the signal output from CP adding section 111, and transmits the signal that has been subjected to the transmission process through antenna 113 as the DM-RS.

Figure 4:
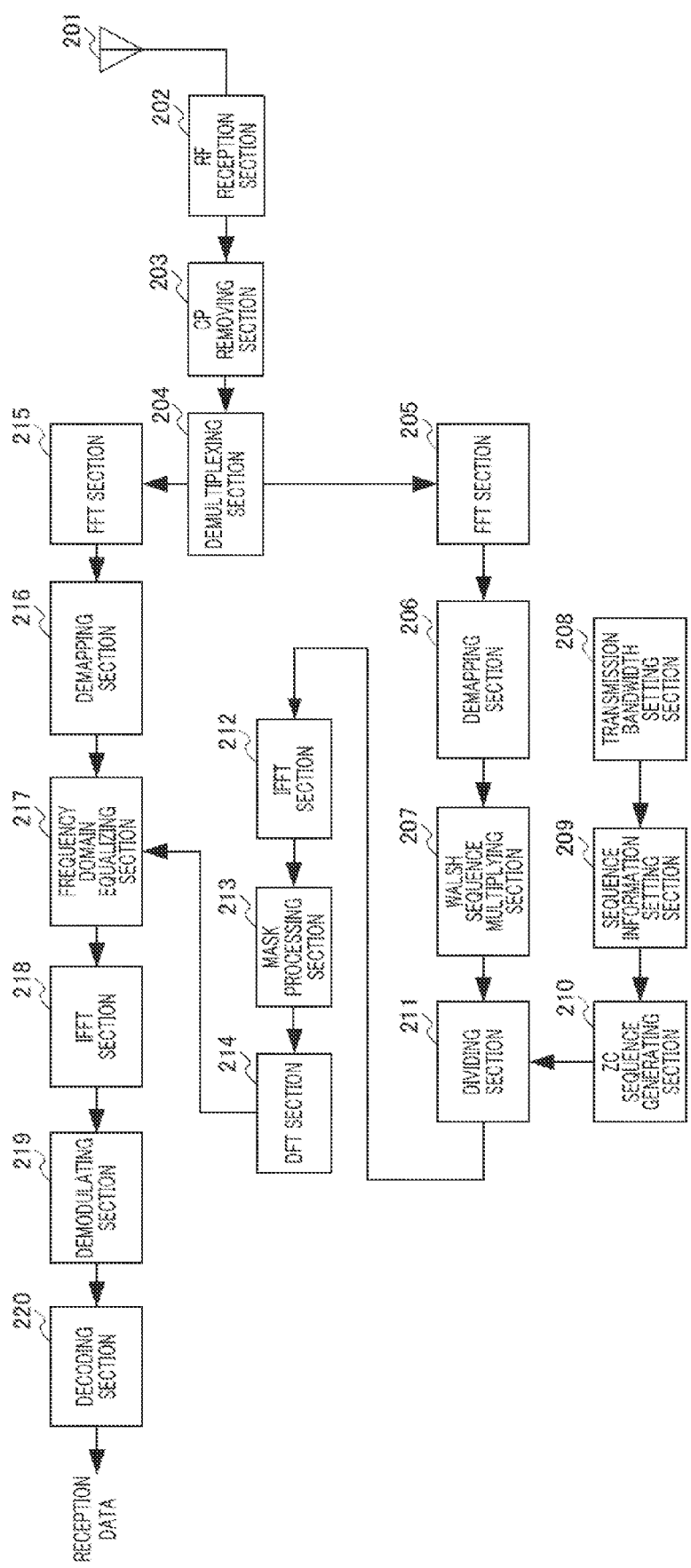
FIG. 4 is a block diagram illustrating the configuration of a base station according to Embodiment 1 of the present invention.

FIG. 4 is a block diagram illustrating the configuration of a base station according to Embodiment 1 of the present invention. Referring to FIG. 4, RF reception section 202 executes a reception process, such as down conversion and A/D conversion, on a signal received through antenna 201, and outputs the signal that has been subjected to the reception process to CP removing section 203.

CP removing section 203 removes the CP included in the signal output from RF reception section 202, and outputs the signal from which the CP has been removed to demultiplexing section 204.

Demultiplexing section 204 demultiplexes the signal output from CP removing section 203 into a DM-RS signal and a data signal, outputs the DM-RS to fast Fourier transform (FFT) section 205, and outputs the data signal to FFT section 215.

FFT section 205 executes an FFT process to convert the DM-RS signal in the time domain output from demultiplexing section 204 into a DM-RS signal in the frequency domain, and outputs the converted DM-RS signal in the frequency domain to demapping section 206.

Demapping section 206 extracts a DM-RS signal corresponding to a desired terminal's transmission band from the DM-RS signal in the frequency domain output from FFT section 205, and outputs the extracted DM-RS signal to Walsh sequence multiplying section 207.

Walsh sequence multiplying section 207 multiplies the DM-RSs of the slots 1 and 2 by the Walsh sequence having the sequence length of 2 same as the terminal side, and performs in-phase addition of the two DM-RS signals. The in-phase added DM-RS signal is output to dividing section 211.

Transmission bandwidth setting section 208 stores the transmission bandwidth of the DM-RS, and outputs the stored transmission bandwidth of the DM-RS to sequence information setting section 209.

Sequence information setting section 209 includes CoMP set setting section 102, serving cell setting section 103, cell selection section 104, and sequence information calculating section 106, similarly to sequence information setting section 101 of the terminal illustrated in FIG. 3. Here, since the description is repeated, the detailed description will not be provided.

ZC sequence generation section 210 generates a ZC sequence using the sequence number and the sequence length output from sequence information setting section 209, and outputs the ZC sequence to dividing section 211.

Dividing section 211 divides the DM-RS signal output from Walsh sequence multiplying section 207 by the ZC sequence, which has been actually transmitted from the terminal, output from ZC sequence generation section 210, and outputs a division result to IFFT section 212.

IFFT section 212 executes the IFFT process on the division result output from dividing section 211, and outputs the signal that has been subjected to the IFFT process to mask processing section 213.

Mask processing section 213 extracts a section in which a correlation value of a desired cyclic shift sequence is present, that is, a correlation value of a window portion by executing a mask process on the DM-RS signal output from IFFT section 212, and outputs the extracted correlation value to discrete Fourier transform (DFT) section 214.

DFT section 214 executes a DFT process on the correlation value output from mask processing section 213, and outputs the correlation value that has been subjected to the DFT process to frequency domain equalizing section 217. Here, the signal output from DFT section 214 is a signal representing a frequency response of a propagation path.

FFT section 215 executes the FFT process to convert a data signal in the time domain output from demultiplexing section 204 into a data signal in the frequency domain, and outputs the converted data signal in the frequency domain to demapping section 216.

Demapping section 216 extracts a data signal corresponding to a desired terminal's transmission band from the data signal output from FFT section 215, and outputs the extracted data signal to frequency domain equalizing section 217.

Frequency domain equalizing section 217 executes an equalizing process on the data signal output from demapping section 216 using the signal representing the frequency response of the propagation path output from DFT section 214, and outputs the signal that has been subjected to the equalizing process to IFFT section 218.

IFFT section 218 executes the IFFT process on the data signal output from frequency domain equalizing section 217, and outputs the signal that has been subjected to the IFFT process to demodulating section 219.

Demodulating section 219 executes a demodulating process on the signal output from IFFT section 218, and outputs the signal that has been subjected to the demodulating process to decoding section 220.

Decoding section 220 executes a decoding process on the signal output from demodulating section 219, and thus extracts a reception data.

Figure 5:
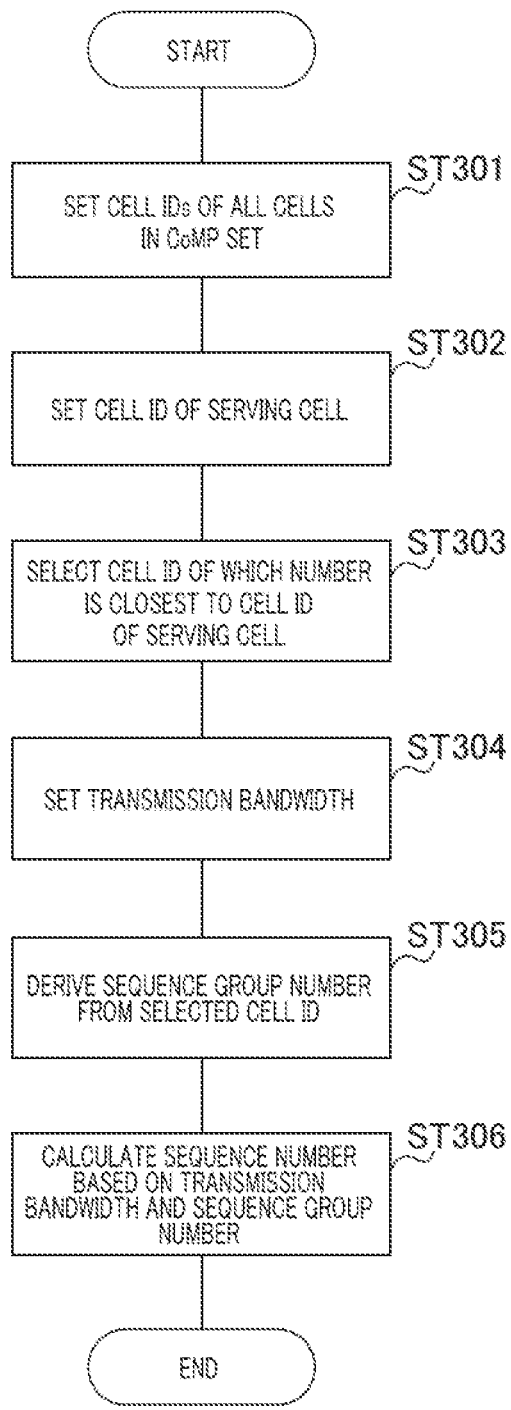
FIG. 5 is a flowchart illustrating an operation of a sequence information setting section illustrated in FIGS. 3 and 4.

Next, an operation of sequence information setting section 101 (209) illustrated in FIGS. 3 and 4 will be described with reference to FIG. 5. Referring to FIG. 5, in step (hereinafter, abbreviated as "ST") 301, CoMP set setting section 102 sets cell IDs of all cells in a CoMP set to cell selection section 104, and in ST302, serving cell setting section 103 sets a cell ID of a serving cell to cell selection section 104.

In ST303, cell selection section 104 selects a cell ID of which number is closest to the cell ID of the serving cell, and in ST304, transmission bandwidth setting section 105 sets a transmission bandwidth of a DM-RS to sequence information calculating section 106.

In ST305, sequence information calculating section 106 derives a sequence group number from the selected cell ID, and in ST306, sequence information calculating section 106 calculates a sequence number based on the derived sequence group number and the set transmission bandwidth.

As described above, sequence information setting section 101 obtains the sequence number used by a cell other than the serving cell from among cells in the CoMP set, and sets the sequence as the DM-RS for a CoMP terminal. Here, a cell that is smallest in a path loss (or distance) occurring between a transmission point of a terminal and a reception point of a cell is generally selected as the serving cell so as to secure the control information reception performance. Thus, when the same sequence as the serving cell is used as the DM-RS and orthogonality of the Walsh sequence collapses, the sequence functions as an interference source having the strongest reception level. In this regard, in the present embodiment, the occurrence of the strongest interference can be prevented by selecting the sequence used by the cell other than the serving cell.

Since the CoMP terminal has information about the cell IDs in the CoMP set so as to report reception quality information or the like, when the cell ID uniquely corresponds to the sequence group number (or sequence number), it is not necessary to newly notify of the sequence group number or the sequence number of the DM-RS for the CoMP terminal. Similarly, it is not necessary to signal the sequence group number from the base station to the CoMP terminal.

Further, when a plurality of cells other than the serving cell are present, the cell ID of which number is closest to or farthest from the cell ID of the serving cell is selected from among the cell IDs in the CoMP set, or a cell of which number is smallest or largest is selected from among all cell IDs other than the serving cell as described above. That is, a predetermined rule is agreed between the terminal and the base station in advance so that one cell can be uniquely selected.

Further, by selecting the sequence used in the CoMP set, the distance between the cells using the same sequence can be the same as in the conventional art (LTE system), and performance degradation of the conventional terminal (the non-CoMP terminal) can be prevented. Meanwhile, when the CoMP terminal uses the sequence used by a cell that does not belong to the CoMP set, the distance between the cells using the same sequence is further reduced to be smaller than that in the conventional system in which the CoMP terminal is not present, and thus intercell interference increases.

As described above, according to Embodiment 1, since the CoMP terminal selects the sequence used by the cell other than the serving cell from among the cells in the CoMP set, it is possible to reduce intersymbol interference between the DM-RS of the CoMP terminal and the DM-RS of the non-CoMP terminal, which occurs due to collapse of othogonality of the Walsh sequence. Thus, it is possible to reduce degradation in the reception performance at the time of the MU-MIMO communication between the CoMP terminal and the non-CoMP terminal.

(Embodiment 2)

Figure 6:
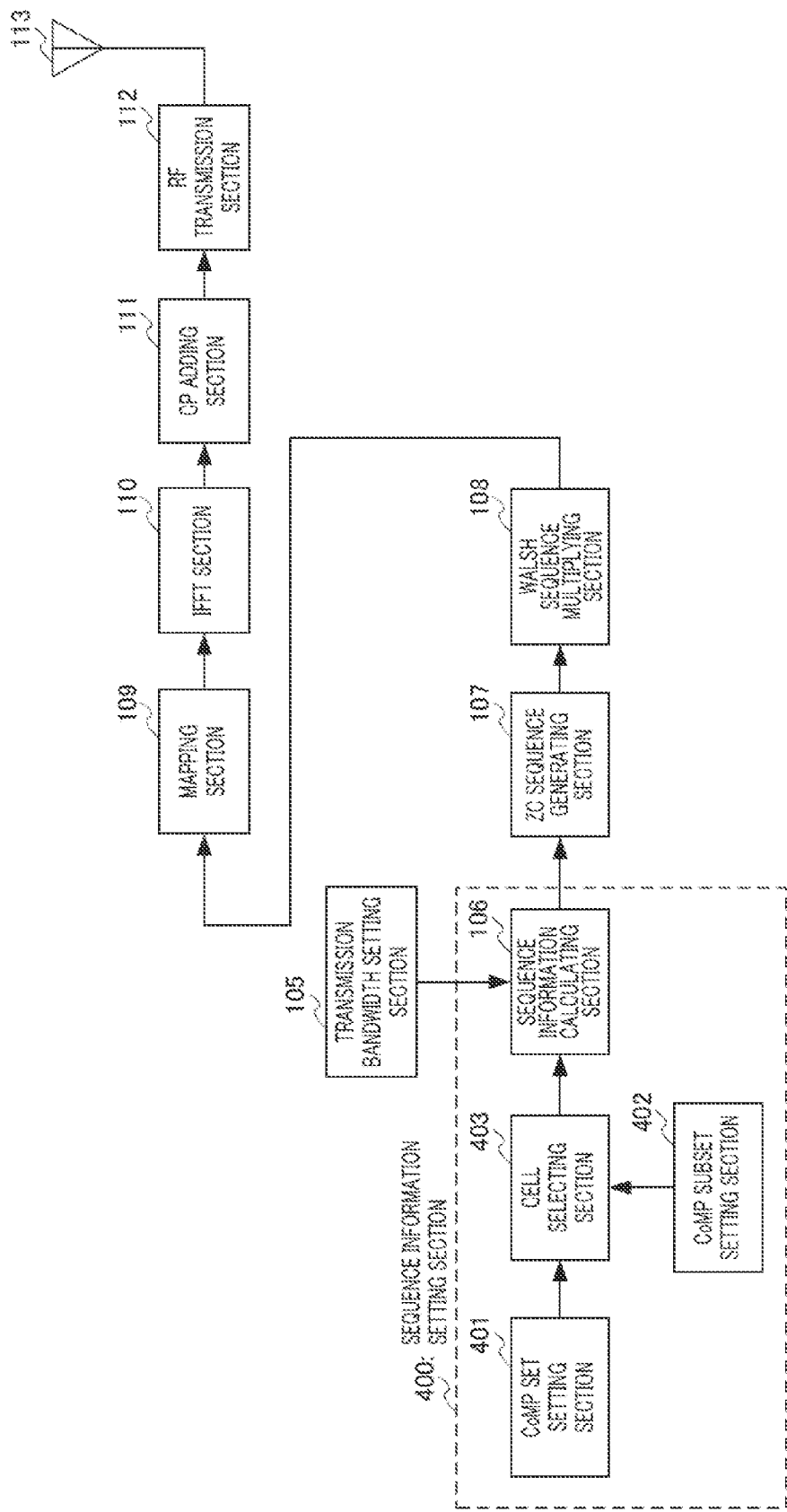
FIG. 6 is a block diagram illustrating the configuration of a terminal according to Embodiment 2 of the present invention.

FIG. 6 is a block diagram illustrating the configuration of a terminal according to Embodiment 2 of the present invention. The difference between FIG. 3 and FIG. 6 lies in that CoMP set setting section 102 is replaced with CoMP set setting section 401, serving cell setting section 103 is replaced with CoMP subset setting section 402, and cell selection section 104 is replaced with cell selection section 403.

CoMP set setting section 402 stores all cell IDs in a group of cells (CoMP measurement set) that are reported about the reception quality of each link of the terminal as a CoMP set, and outputs all stored cell IDs to cell selection section 403. Here, the CoMP set is used as the CoMP measurement set.

CoMP subset setting section 402 stores a group of cells (CoMP transmission points) that actually transmit and receive data, among cells in the CoMP set, as a CoMP subset, and outputs cell IDs of cells belonging to the subset of the CoMP set set by CoMP set setting section 402 to cell selection section 403. The CoMP subset is selected based on the path loss between the CoMP terminal and the base station.

Cell selection section 403 selects a cell which is included not in the CoMP transmission point but in the CoMP measurement set, based on the cell ID of each cell in the CoMP measurement set output from CoMP set setting section 401 and the cell ID of each cell in the CoMP subset output from CoMP subset setting section 402. That is, cell selection section 403 selects a cell having a small path loss from among the CoMP measurement sets. Information from which the sequence group number for the DM-RS used by the selected cell can be derived is output to sequence information calculating section 106.

The configuration of the base station according to Embodiment 2 of the present invention is different from the configuration of FIG. 4 according to Embodiment 1 in that sequence information setting section 209 is replaced with sequence information setting section 400 illustrated in FIG. 6, and thus the detailed description will not be provided.

Figure 7:
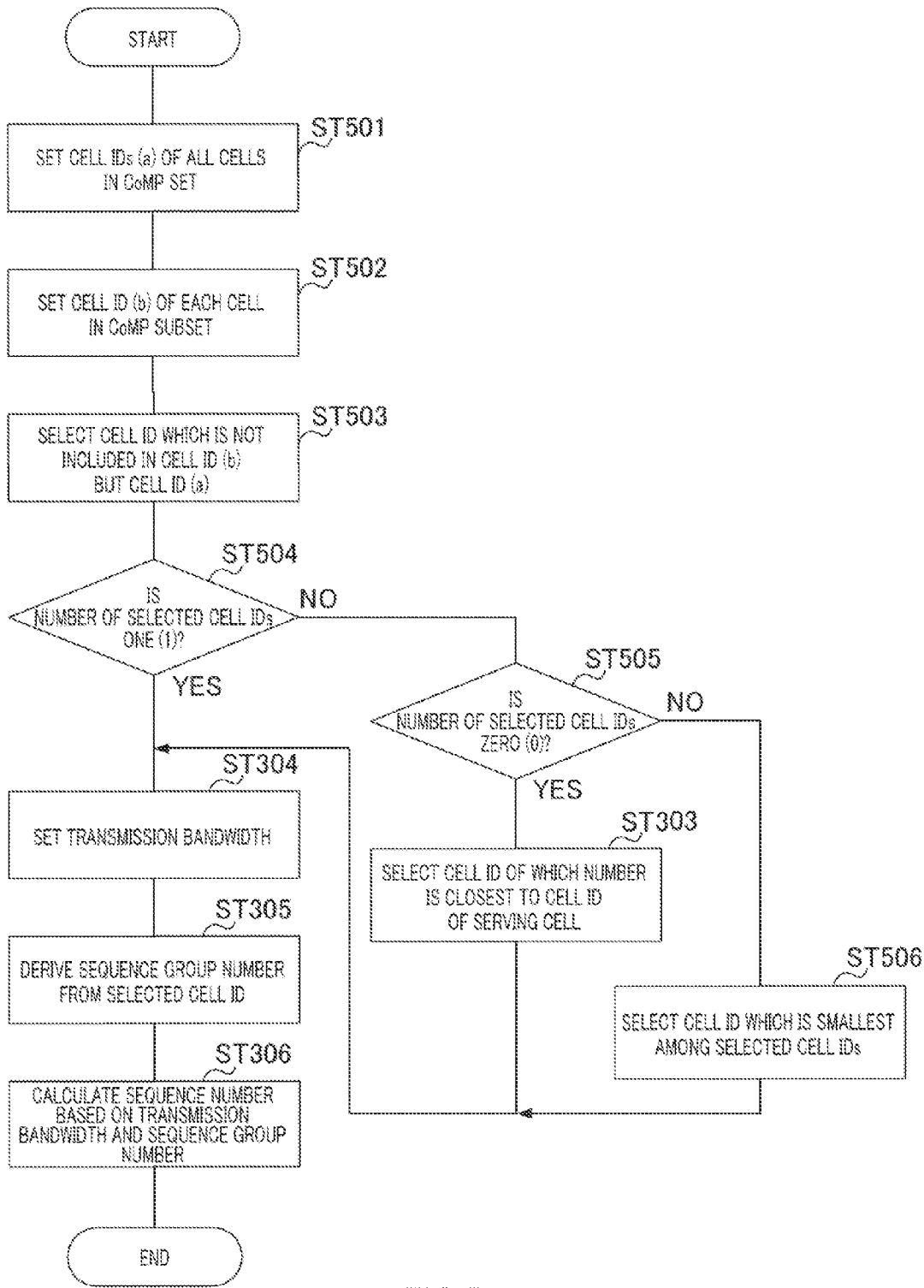
FIG. 7 is a flowchart illustrating an operation of a sequence information setting section illustrated in FIG. 6.

Next, an operation of sequence information setting section 400 illustrated in FIG. 6 will be described with reference to FIG. 7. In FIG. 7, the same components as in FIG. 5 are denoted by the same reference numerals, and thus the redundant description will not be repeated. Referring to FIG. 7, in ST501, CoMP set setting section 401 sets cell IDs of all cells in the CoMP measurement set to cell selection section 403, and in ST502, CoMP subset setting section 402 sets cell IDs of cells in the CoMP subset to cell selection section 403.

In ST503, cell selection section 403 selects a cell that is included not in the CoMP subset but in the CoMP measurement set, and in ST504, cell selection section 403 determines whether the number of cell IDs selected in ST503 is one. When it is determined that the number of selected cells is one (YES), the process proceeds to ST304. When it is determined that the number of selected cells is not one (NO), the process proceeds to ST505.

In ST505, cell selection section 403 determines whether the number of cell IDs selected in ST503 is zero (0). When it is determined that the number of selected cell IDs is zero (0) (YES), the process proceeds to ST303. When it is determined that the number of selected cells is not zero (0) (NO), the process proceeds to ST506.

In ST506, cell selection section 403 selects a cell ID that is smallest among the cell IDs selected in ST503.

Figure 8:
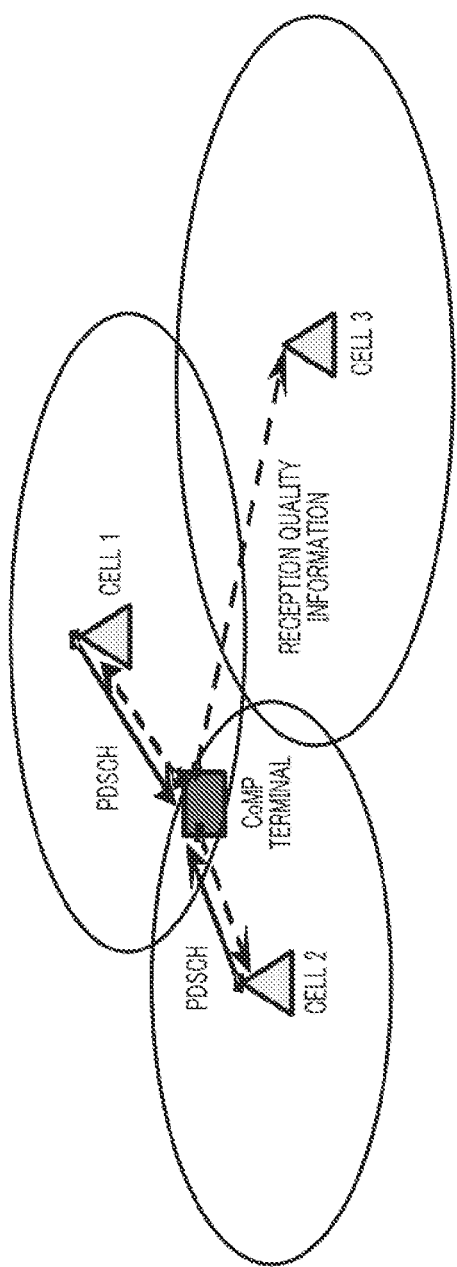
FIG. 8 is a diagram illustrating a state in which a cell selection section selects a cell ID.

Here, a state in which cell selection section 403 selects a cell ID will be concretely described with reference to FIG. 8. In FIG. 8, it is assumed that the CoMP measurement set includes cells 1 to 3, and the CoMP subset includes cells 1 and 2. Further, it is assumed that cell selection section 403 selects cell 3 as a cell which is included not in the CoMP subset but in the CoMP measurement set. As a result, a sequence used by a cell having a largest path loss can be used as the DM-RS for the CoMP terminal.

As described above, according to Embodiment 2, since the CoMP terminal selects the cell which is included not in the CoMP subset but in the CoMP measurement set, it is possible to more reliably reduce intersymbol interference between the DM-RS of the CoMP terminal and the DM-RS of the non-CoMP terminal, which occurs due to collapse of othogonality of the Walsh sequence. In addition, since the sequence used for reducing the intersymbol interference between terminals can be more reliably selected compared to Embodiment 1, degradation in the reception performance of MU-MIMO communication between the CoMP terminal and the non-CoMP terminal can be reliably reduced.

In FIG. 8, cells that transmit downstream data are defined as the CoMP subset; however, cells that receive upstream data may be defined as the CoMP subset.

Further, when the number of cells in the CoMP set and the number of cells in the CoMP subset are defined as in Formula 1, in Embodiment 2, one cell to be selected can be uniquely obtained.

(number of cells in CoMP set)=(number of cells in CoMP set)+1     (1)

(Embodiment 3)

Embodiment 2 has been described under the assumption that the cell configuring the CoMP subset is selected based on the path loss between the CoMP terminal and the base station. However, the cell configuring the CoMP subset may be selected in view of load sharing, for example, so as to equalize traffics of cells. In this regard, Embodiment 3 of the present invention will be described in connection with an example in which the intersymbol interference between the DM-RS of the CoMP terminal and the DM-RS of the non-CoMP terminal is more reliably reduced regardless of whether the cell configuring the CoMP subset is selected based on the path loss between the CoMP terminal and the base station.

Figure 9:
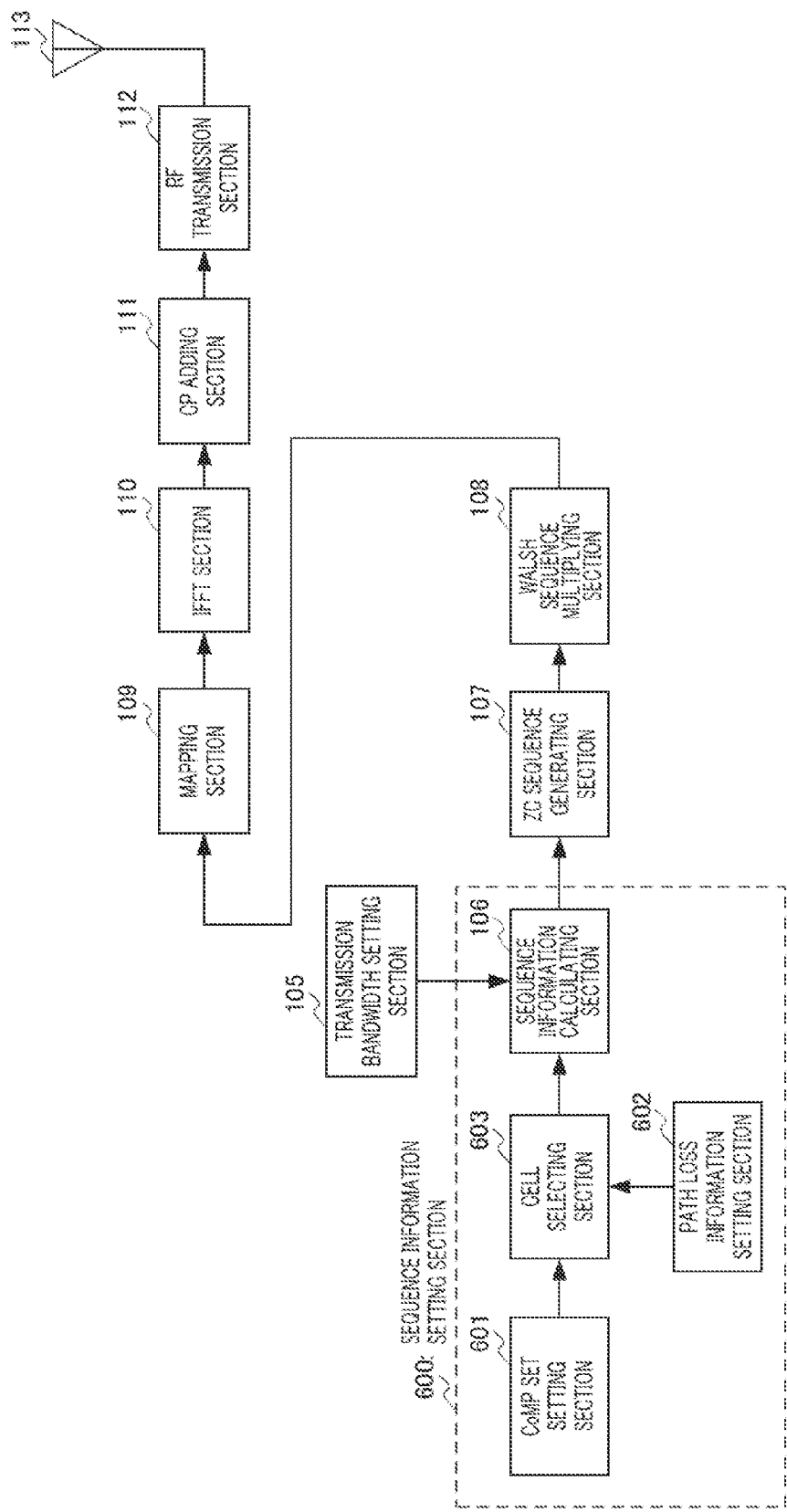
FIG. 9 is a block diagram illustrating the configuration of a terminal according to Embodiment 3 of the present invention.

FIG. 9 is a block diagram illustrating the configuration of a terminal according to Embodiment 3 of the present invention. The difference between FIG. 3 and FIG. 9 lies in that CoMP set setting section 102 is replaced with CoMP set setting section 601, serving cell setting section 103 is replaced with path loss information setting section 602, and cell selection section 104 is replaced with cell selection section 603.

CoMP set setting section 601 stores all cell IDs in the CoMP measurement set, and outputs all stored cell IDs to cell selection section 603. Here, the CoMP set is used as the CoMP measurement set.

Path loss information setting section 602 outputs a path loss value of each cell in the CoMP set to cell selection section 603. The path loss value has reported to the base station by the own terminal.

Cell selection section 603 selects a cell having a largest path loss value based on the cell ID of each cell in the CoMP set output from CoMP set setting section 601 and the path loss value of each cell output from path loss information setting section 602. Information from which the sequence group number for the DM-RS used by the selected cell can be derived is output to sequence information calculating section 106.

The configuration of the base station according to Embodiment 3 of the present invention is different from the configuration of FIG. 4 according to Embodiment 1 in that sequence information setting section 101 is replaced with sequence information setting section 600 illustrated in FIG. 9, and thus the detailed description will not be repeated.

Figure 10:
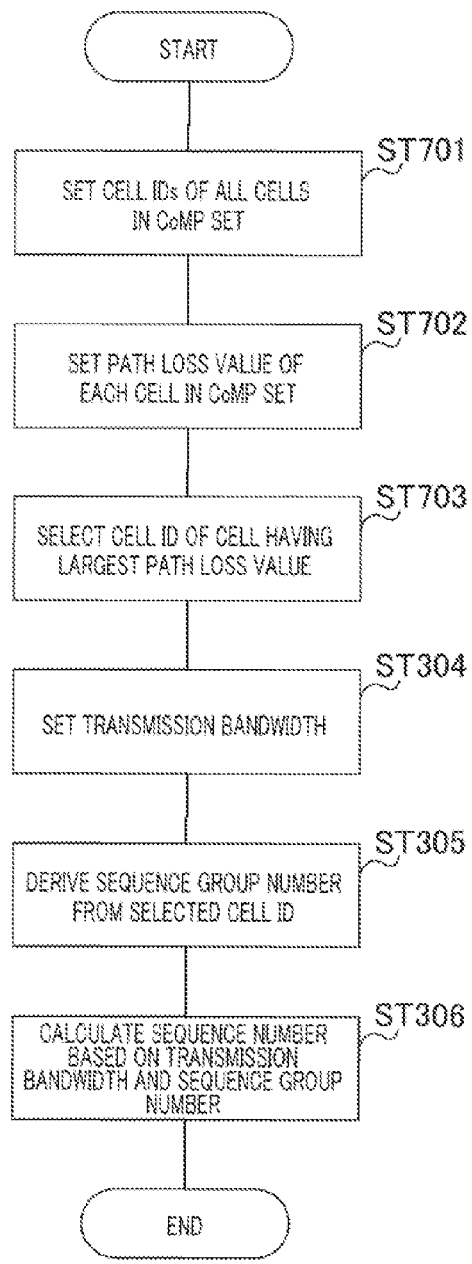
FIG. 10 is a flowchart illustrating an operation of a sequence information setting section illustrated in FIG. 9.

Next, an operation of sequence information setting section 600 illustrated in FIG. 9 will be described with reference to FIG. 10. In FIG. 10, the same components as in FIG. 5 are denoted by the same reference numerals, and thus the redundant description will not be repeated. Referring to FIG. 10, in ST701, CoMP set setting section 601 sets cell IDs of all cells in the CoMP measurement set to cell selection section 603, and in ST702, path loss information setting section 602 sets a path loss value of each cell in the CoMP set to cell selection section 603.

In ST703, cell selection section 603 selects a cell having a largest path loss value from among the cells included in the CoMP measurement set.

As described above, sequence information setting section 600 obtains the sequence number used by the cell having the largest path loss among the path losses of links which the terminal has reported to the base station, and sets the sequence as the DM-RS for the CoMP terminal. Here, the base station that performs scheduling of the CoMP terminal has information about the path losses reported from the terminals belonging to the CoMP set, and thus the sequence number to be selected by the terminal can match with the sequence number to be selected by the base station.

Further, when a plurality of cells have the same path loss value and satisfy the condition, similarly to Embodiment 1, a cell having a minimum value or a maximum value is selected from among cell IDs satisfying the condition. That is, a predetermined rule is agreed between the terminal and the base station in advance so that one cell can be uniquely selected.

As described above, according to Embodiment 3, the CoMP terminal selects the sequence used by the cell having the largest path loss among the path losses of links reported to the base station. Thus, the sequence used by the cell having the large path loss can be used as the DM-RS for the CoMP terminal regardless of whether the cell configuring the CoMP subset is selected based on the path loss between the CoMP terminal and the base station. Thus, it is possible to more reliably reduce intersymbol interference between the DM-RS of the CoMP terminal and the DM-RS of the non-CoMP terminal which occurs due to collapse of othogonality of the Walsh sequence.

The present embodiment has been described in connection with the path loss as an example; however, the present invention is not limited thereto. The sequence may be selected based on the reception quality information such as received signal code power (RSCP), reference signal received power (RSRP), reference signal received quality (RSRQ), and received Signal Strength Indicator (RSSI), which are defined in the LTE. That is, by selecting the sequence used by the cell that is worst in the reception quality as the DM-RS for the CoMP terminal, the same effect as in the present embodiment is obtained.

In the above embodiments, the sequence used as the DM-RS for the CoMP terminal at the time of MU-MIMO may differ from that at the time of single user (SU)-MIMO. Specifically, at the time of MU-MIMO, the sequence may be selected by the methods of Embodiments 1 to 3. Thus, degradation in the reception performance at the time of MU-MIMO is prevented. Further, at the time of SU-MIMO, the sequence may be selected by a method different from the above embodiments. For example, similarly to the non-CoMP terminal, the sequence used by the serving cell is selected. Thus, since the sequence used at the time of non-CoMP communication can be made the same as the sequence used at the time of CoMP communication, the process for calculating the sequence may not be performed. Since the intersymbol interference with another terminal does not occur at the time of SU-MIMO, the above mentioned problem does not occur in the present invention.

The above embodiments have been described in connection with the example in which the present invention is implemented by a hardware configuration; however, the present invention may be implemented by software.

Further, the functional blocks used for description of the above embodiment are typically implemented as large scale integrations (LSIs) which are integrated circuits (ICs). Further, each of the above functional blocks may be implemented as a single chip, some or all of the above functional blocks may be implemented as a single chip. The LSI has been used herein; however, according to the difference in the integration, names such as an IC, a system LSI, a super LSI, or an ultra LSI may be used.

A circuit integration technique is not limited to the LSI, and implementation by a dedicated circuit or a universal processor may be used. After the LSI is fabricated, a field programmable gate array (FPGA) which is programmable, or a reconfigurable processor capable of reconfiguring connections or settings of circuit cells in the LSI may be used.

Further, when a circuit integration technique of replacing the LSI by another technique advanced or derived from a semiconductor technology appears, the functional blocks may be integrated using the technique. There may be a possibility that a biotechnology will be applied.

The above embodiments have been described in connection with the antenna, but the present invention may be similarly applied to an antenna port.

The antenna port refers to a logical antenna configured with one or more physical antennas. That is, the antenna port is not necessarily referred to one physical antenna but may be referred to an array antenna configured with a plurality of antennas.

For example, in the 3GPP-LTE, the number of physical antennas configuring the antenna port is not defined, and the antenna port is defined as a minimum unit in which the base station can transmit different reference signals.

Further, the antenna port may be defined as a minimum unit for multiplying a weight of a precoding vector.

The disclosure of Japanese Patent Application No. 2009-169211, filed on Jul. 17, 2009, including the specification, drawings and abstract, are incorporated herein by reference in its entirety.

Industrial Applicability

The radio communication terminal apparatus and the radio communication method according to the present invention can be applied to a mobile communication system or the like.

Reference Signs List 101, 209, 400 Sequence information setting section
102, 401, 601 CoMP set setting section
103 Serving cell setting section 104, 403, 603 Cell selection section
105, 208 Transmission bandwidth setting section
106 Sequence information calculating section
107, 210 ZC sequence generation section
108, 207 Walsh sequence multiplying section
109 Mapping section
110, 212, 218 IFFT section
111 CP adding section
112 RF Transmission section
113, 201 Antenna
202 Reception RF section
203 CP removing section
204 Demultiplexing section 205, 215 FFT section
206, 216 Demapping section
211 Dividing section
213 Mask processing section
214 DFT section
217 Frequency domain equalizing section
219 Demodulating section
220 Decoding section
402 CoMP subset setting section
602 Path loss information setting section

The invention claimed is:

1. A radio communication terminal apparatus that performs transmission and reception with a plurality of base stations together in a coordinated manner that allows the plurality of base stations to receive and synthesize a transmission signal from the radio communication terminal apparatus, the radio communication terminal apparatus comprising:
a base station selection section that selects a base station from among the plurality of base stations for performing transmission and reception in the coordinated manner together with a base station of the plurality of base stations that transmits control information addressed to the radio communication terminal apparatus;
a Zadoff-Chu (ZC) sequence generation section that generates a reference signal using a ZC sequence assigned to the selected base station; and
a transmission section that transmits the generated reference signal.

2. The radio communication terminal apparatus according to claim 1, wherein the base station selection section selects a base station other than a base station that actually transmits and receives data from among the plurality of base stations.

3. A radio communication terminal apparatus that performs transmission and reception with a plurality of base stations in a coordinated manner, the radio communication terminal apparatus comprising:
a base station selection section that selects a base station other than a base station that transmits control information addressed to the radio communication terminal apparatus from among the plurality of base stations;
a Zadoff-Chu (ZC) sequence generation section that generates a reference signal using a ZC sequence assigned to the selected base station; and
a transmission section that transmits the generated reference signal,
wherein the base station selection section selects a base station having a maximum path loss value from among the plurality of base stations.

4. A radio communication method for performing transmission and reception by a plurality of base stations with a radio communication terminal apparatus together in a coordinated manner that allows the plurality of base stations to receive and synthesize a transmission signal from the radio communication terminal apparatus, the radio communication method comprising:
selecting a base station from among the plurality of base stations for performing transmission and reception in the coordinated manner together with a base station that transmits control information addressed to the radio communication terminal apparatus;
generating a reference signal using a Zadoff-Chu (ZC) sequence assigned to the selected base station; and
transmitting the generated reference signal.

* * * * *